United States Patent

Morper et al.

(10) Patent No.: US 10,084,694 B2
(45) Date of Patent: Sep. 25, 2018

(54) CONVEYING TRAFFIC IN A COMMUNICATIONS NETWORK SYSTEM

(75) Inventors: Hans-Jochen Morper, Erdweg (DE); Ernst-Dieter Schmidt, Feldkirchen-Westerham (DE)

(73) Assignee: Nokia Solutions and Networks Oy, Espoo (FI)

(*) Notice: Subject to any disclaimer, the term of this patent is extended or adjusted under 35 U.S.C. 154(b) by 665 days.

(21) Appl. No.: 14/369,841

(22) PCT Filed: Dec. 29, 2011

(86) PCT No.: PCT/EP2011/074243
§ 371 (c)(1),
(2), (4) Date: Jul. 29, 2014

(87) PCT Pub. No.: WO2013/097900
PCT Pub. Date: Jul. 4, 2013

(65) Prior Publication Data
US 2014/0363163 A1 Dec. 11, 2014

(51) Int. Cl.
*H04L 12/28* (2006.01)
*H04L 12/717* (2013.01)
(Continued)

(52) U.S. Cl.
CPC ............ *H04L 45/42* (2013.01); *H04B 10/27* (2013.01); *H04J 14/0227* (2013.01); *H04J 14/0283* (2013.01); *H04J 14/0286* (2013.01); *H04L 45/04* (2013.01); *H04L 45/38* (2013.01); *H04J 14/0282* (2013.01)

(58) Field of Classification Search
CPC ......... H04L 45/12; H04L 45/04; H04L 45/38; H04L 47/2442; H04L 69/22; H04B 10/27; H04W 28/10
See application file for complete search history.

(56) References Cited

U.S. PATENT DOCUMENTS 9,237,209 B2 * 1/2016 Proctor, Jr. ............ H04L 1/0001
9,491,085 B2 * 11/2016 Ee .......................... H04L 45/00
(Continued)

FOREIGN PATENT DOCUMENTS

| CN | 101741712 A | 6/2010 |
|---|---|---|
| CN | 101938300 A | 1/2011 |

(Continued)

OTHER PUBLICATIONS

Sakurauchi, Y., et al., "Open Web: Seamless Proxy Interconnection at the Switching Layer", Nov. 17-19, 2010, Networking and Computing (ICNC), 2010 First International Conference (5 pages).
(Continued)

*Primary Examiner* — Shukri Taha
(74) *Attorney, Agent, or Firm* — Harrington & Smith

(57) ABSTRACT

Traffic is conveyed in a communications network by a homogeneous transport network from edge nodes located at edges of the homogeneous transport network to at least one processing center (D-center, C-center) located at an edge of the homogeneous transport network. The at least one processing center processes the traffic and controls and forwards traffic to be further conveyed to the edge nodes.

13 Claims, 7 Drawing Sheets

(51) Int. Cl.
*H04L 12/721* (2013.01)
*H04L 12/715* (2013.01)
*H04J 14/02* (2006.01)
*H04B 10/27* (2013.01)

(56) References Cited

U.S. PATENT DOCUMENTS

| | | | |
|---|---|---|---|
| 2005/0068967 A1 | 3/2005 | Terry et al. | 370/395.52 |
| 2008/0049621 A1* | 2/2008 | McGuire | H04L 12/24 370/236.2 |
| 2008/0063005 A1* | 3/2008 | Roos | H04N 21/238 370/432 |
| 2009/0232147 A1* | 9/2009 | Belling | H04M 7/0039 370/401 |
| 2012/0300615 A1* | 11/2012 | Kempf | H04W 24/02 370/216 |

FOREIGN PATENT DOCUMENTS

| | | |
|---|---|---|
| WO | WO 2011/067350 A1 | 6/2011 |
| WO | WO 2012/055446 A1 | 5/2012 |

OTHER PUBLICATIONS

Bozakov, Z., "Architecture and Algorithms for Virtual Routers as a Service", Jun. 6-7, 2011, Quality of Service, 2011 IEEE 19$^{th}$ International workshop, 2 pgs.

Kantola, R., et al., "Transport for Carrier Grade Internet", © 2009 IEEE, 8 pgs.

McKeown, N., et al., "OpenFlow: Enabling Innovation in Campus Networks", Apr. 2008, ACM SIGCOMM Computer Communication Review, vol. 38, No. 2, 6 pgs.

Sakurauchi, Y., "Open Web: Seamless Proxy Internconnection at the Switching Layer", Nov. 17-19, 2010, Networking and Computing (ICNC), 2010 First International Conference, abstract only.

"OpenFlow Switch Sepcificton, Version 1.1.0 Implemented (Wire Protocol Ox02)", Feb. 28, 2011, 56 pgs.

Donegan, Patrick, "IPsec Deployment Strategies for Securing LTE Networks", http://go.radisys.com/rs/radisys/images/paper-seg-ipsec-deployment.pdf; May 2011, 14 pgs.

* cited by examiner

CONVEYING TRAFFIC IN A COMMUNICATIONS NETWORK SYSTEM

FIELD OF THE INVENTION

The present invention relates to conveying traffic in a communications network system. In particular, the invention relates to providing a transport network for conveying communication traffic.

List of Abbreviations

The following meanings for the abbreviations used in this specification apply:

2G, 3G, 4G mobile network=second, third, fourth generation mobile network
ANDSF=access network discovery and selection function
AON=active optical network
API=application programming interface
BSC=base station controller
BTS=base transceiver station
CCC=common control client
CCS=common control server
CET=carrier Ethernet transport
DWDM=dense wavelength division multiplex
ePDG=evolved packet data gateway
eNodeB=evolved node B
E2E=end-to-end
EDFA=Erbium Doped Fiber Amplifier
EPC=evolved packet core
EPON=Ethernet based PON
FTP=file transfer protocol
FTTB=fiber to the building
FTTC=fiber to the curb
FTTH=fiber to the home
GMPLS=generalized MPLS
GPON=gigabit PON
GPRS=general packet radio services
HLR=home location register
HSS=home subscriber server
HTTP=hypertext transfer protocol
IP=internet protocol
LTE=long term evolution
MME=mobility management entity
MNO=mobile network operator
MPLS=multi protocol label switching
NGOA=next generation optical access
OEO=optical-electrical-optical
OF=OpenFlow
OFC=OpenFlow Consortium
OLT=optical line termination
ONU=optical network unit
P-GW=packet data network gateway
PON=passive optical network
RAN=radio access network
RNC=radio network controller
ROADM=reconfigurable optical add-drop multiplexer
SDH=synchronous digital hierarchy
SDN=service delivery network
SGSN=serving GPRS support node
S-GW=serving gateway
UE=user equipment
VPN=virtual private network
WiMAX=worldwide interoperability for microwave access
WLAN=wireless local area network

BACKGROUND OF THE INVENTION AND PRIOR ART

The initial situation and the object of the invention is best illustrated on the example of a state of the art mobile network. However, similarities and an equivalent applicability of the invention to other, e.g. fixed line or wireline access networks are easily comprehensible.

FIG. 1 shows a (simplified) principal architecture of a fourth generation (4G) mobile network. User terminals (UE) are connected via a radio access network (RAN) comprising eNodeB base stations, through an evolved packet core (EPC), to service endpoints in a service delivery network (SDN), which most often is represented by server farms, where content and services are stored and/or made available for UE access. In this application, an SDN may represent a mobile network operator (MNO) service network, or a service network of a third party service provider, or the Internet, or any other kind of network providing services or access to services. The EPC mainly comprises gateways, e.g. serving gateways (S-GW) which mediate UE traffic from the base stations towards packet data network gateways (P-GW), which act as transition points to SDN or other networks. The involvement of eNodeB, S-GW and P-GW is to a certain extent steered by a mobility management entity (MME). Besides end-to-end (E2E) data, which should be exchanged between both peer ends (UE/SDN), denoted as U-plane further on and in FIG. 1 shown in bold lines, there is a significant exchange of mobile network control messages between nodes of the mobile network, which are not necessarily related to the services themselves (payload), but which are necessary to run and ensure an E2E service delivery with mobile users. This information exchange, denoted as C-plane further on and shown in dotted lines in FIG. 1, comprises e.g. measurement reports from UE to eNodeB and MME, user/service related information between UE and a P-GW, tunnel setup information between S-GW and P-GW, user authentication and authorization between home subscriber server (HSS) or home location register (HLR) and a variety of nodes. Note that this information is not to be mistaken with control messages between services and user devices (like HTTP or FTP), which are considered to belong to a higher layer, and that this information is in no way related to control messages of underlying transport nodes. In FIG. 1, nodes having control functionality are indicated with a C-triangle, those having data forwarding functionality are marked with a D-circle, and of course, some nodes may have both functionalities. Note, that all entities, even if shown only once in FIG. 1, may appear in multiple instances within a related network.

With respect to transport, there is most often a clear separation between RAN and EPC. Base stations may be far from each other in rural environments and densely co-located in urban areas. Thus, operators do have to cooperate and often have to rely on third party transport, when they do not own a transport network in a certain area (e.g. in rural areas).

RAN transport usually covers the radio section of the access area and a potential first level of aggregation between base stations, their potentially common control and the transition to the EPC. Related transmission technologies may use any kind of media, including e.g. wires, fibers or air (microwaves), combined with any suitable mechanisms and/or protocols like e.g. DSL, Ethernet, IP, etc. Optical systems like passive optical networks (PON) offer attractive solutions for aggregation bandwidth sharing, and future WDM based PONs, also referred to as next generation optical access (NGOA), as disclosed with WO2011/067350 A1, enable virtually unlimited transmission bandwidth for each base station and user.

The EPC typically provides e.g. further levels of aggregation, user authentication, service invocation including mobility management, and routing and switching of information between users and service providers. It usually employs long haul optical transmission based on ring and mesh structures with DWDM and MPLS/GMPLS technologies. Cross connect and router functions are typically used for interconnecting the RAN with the EPC. S-GWs and P-GWs are typically placed in the transition areas between RAN and EPC and EPC and SDN in order to deal with disruptions in related transport technologies.

New concepts like network virtualization and OpenFlow have introduced new capabilities in the way of operating, controlling and managing telecommunication networks. Network virtualization enables the separation and isolation of distinctive networking resources from a physical network infrastructure and to use them to form virtual networks, which are completely independent of each other (see e.g. PCT/EP2010/066534). OpenFlow advocates the separation of the control (C-plane) and the forwarding plane (U-plane) of switches and routers so as to form simple and high performant forwarding machines to be controlled by a highly flexible and efficient control system (see www.openflow.org).

According to the above concept, commercial-off-the-shelf routing and switching platforms are (re-)used. In a simplified view, those already comprise facilities as shown in FIG. 2 for data path handling (e.g. a switching matrix), related control software and flow tables, which define how data packets are handled (routed, switched) depending e.g. on the information that is contained in the packet headers. A simple rule could for example mean that incoming packets on port 0 will be forwarded to port 2, if the destination address found in the header can be resolved, and to port 3 otherwise.

The approach that OpenFlow brings to this system is that the flow tables can be manipulated from outside of the device via an application programming interface API (OpenFlow handler/interface) and that a control instance can slice different resources from the device and present those, or a subset of those, to further control instances outside of the device (FlowVisor). This way an application can manipulate resources of e.g. a group of Ethernet switch(es) by manipulating a virtual flow table, which is representing an instance, which appears as a single switch or a FlowVisor instance, hiding a hierarchical structure comprising of switches and/or further FlowVisor controllers behind it. The application doesn't need to have the knowledge of whether its access to resources directly affects a physical switch or a virtual switch formed by several switches, which may e.g. be hierarchically organized.

Transport for 4th generation and beyond mobile networks will advantageously use fiber based infrastructures. PON based systems or point-to-point solutions can be used in the access as illustrated in FIG. 3. WDM rings may be used for further aggregation and DWDM is the solution for the long haul. However, for each operator, the network and the combination of the components may be different. Also upgrade scenarios with SDH or Sonet rings as installed today will still be used in the future. Multi-generation RANs (combinations of 2G, 3G and 4G technologies) will add to the diversity.

Due to the inhomogeneous transport layers (packet vs. SDH/TDM, fibre vs. copper vs. microwave) U-plane (user data) and C-plane (operator control data) are kept agnostic of the underlying transport technologies and are based on IP/MPLS or carrier Ethernet technologies (CET). As a consequence, there are a lot of transition points where e.g. optical or microwave radio access is interworked into optical Metro and/or long haul transport, each with conversion from one to another transport technology. At these conversion points electrical-optical or optical-electrical-optical (OEO) conversion is required, and most often IP/MPLS switches and routers are needed, each with high demands on performance and throughput, which require costly and energy consuming installations. Especially with the expected growth in bandwidth (estimated factor of 100 within the next 10 years) those neuralgic points in the network become more and more critical.

In the near future most likely all transport network interconnections will be fiber based and thus purely optical—but OEO conversions will still be necessary in the nodes, just to cope with the different transport technologies. This will impact the overall network architecture, its performance, and the related cost in an unbeneficial manner.

Todays network architectures and their related distribution of functions to nodes in a certain way reflect the capabilities and deficiencies of the transport networks. In many cases the IP layer is considered as some kind of a "convergence layer". Whenever underlying technologies cannot be interworked properly on lower layers, the issue is solved by routing. This is perfectly reflected and illustrated by the multiplicity of different nodes to support the different functions in the 3G and 4G system architectures—and each of these nodes may mean an additional OEO conversion.

In the evolution of mobile networks, functionality has been moved around between network nodes to cope with new challenges (2G BTS and BSC became 3G NodeB and RNC with completely different function split) and exploitation of new transport capabilities. Still, the multiplicity of different nodes is still there. Even worse, the change in architecture requires significant investments in the networks in order to upgrade the network and its nodes with the functions required by each new architecture.

The complexity of the system further implies certain delays incurred by control information to be processed and passed through the nodes and to be exchanged between the nodes. This limits the performance and the throughput of the system for handling of e.g. communication requests, mobility support, protection switching, and many other control activities. Network growth and additional function upgrades even add to such issues.

A separation of C- and U-plane as proposed by OpenFlow would not solve the problems as the forwarding part of the nodes would still be in place and still require OEO conversion, electronic switching and forwarding, and exchange of control information in each node. In some cases such separation would even further reduce the performance due to additional delays incurred by moving around the control information between the locations of the forwarding functions and the related remote control entities.

Another frequently recommended and probably the most popular approach to deal with such problems is the attempt to offload certain nodes from certain traffic, that not really needs these nodes' functions. This implies the separation of related incoming traffic in the edge nodes in order to bypass other core functions on the way to its destination edge. Still, this has quite limited effects, due to still a significant number of conversions needed and an increase in control complexity.

It is thus an object of the invention to tackle the deficiencies, limitations and complexities as described above and to provide a solution that enables a more efficient and more performant conveyance of traffic in telecommunication networks.

SUMMARY OF THE INVENTION

The object of the invention is achieved by a method, system and apparatus for conveying traffic in telecommunication networks in an improved manner.

In one aspect, the invention aims at providing a transport network which can be operated with a minimum set of transport nodes for fixed and mobile network application and usage employing virtualization techniques.

In another aspect, the invention completely breaks with the prevailing paradigm to distribute core functions across different network nodes and to offload traffic at the network edges in order to bypass and unload certain nodes from traffic not really requiring their functional support.

The resulting system, apparatus and methods are defined below and in the appended claims. Aspects of the invention may also be implemented by a computer program product.

According to an aspect of the invention, a system for conveying traffic in a communications network is provided, the system comprising:
 a homogeneous transport network;
 edge nodes located at edges of the homogeneous transport network; and
 at least one processing center located at an edge of the homogeneous transport network,
 wherein the homogeneous transport network is configured to convey traffic from the edge nodes to the at least one processing center, and
 wherein the at least one processing center is configured to process the traffic and to control and forward traffic to be further conveyed to the edge nodes.

A homogeneous transport network is characterized in that it provides a continuous, non-disrupted and transparent transport path from one edge to another edge of the network. Such a transport path usually appears as a single hop or a single span connection from a higher layer point of view. Typical implementations may use tunneling mechanisms implemented with suitable protocols such as e.g. MPLS/GMPLS or IEEE 802.1Q (Ethernet VLAN) and the like. In an optical transport network the equivalent may be a purely optical transport path, e.g. a path on a single wavelength, or a path with purely optical wavelength conversion(s), or a path with another type of wavelength conversion(s), but with no data processing outside of the optical domain.

The homogeneous transport network used by the invention is further preferably dimensioned with sufficient bandwidth, so as to not delimit the amount of application data intended to be transported between the devices connected to its edges. Hence, from an application point of view, the homogeneous transport network appears as providing virtually unlimited bandwidth. The homogeneity of the transport network enables cost efficient provisioning of bandwidth, since no expensive and performance eating conversions are required.

The homogeneous transport network may be an optical transport network which provides optical transport paths for the traffic conveyed between the edge nodes and the at least one processing center.

The optical transport network may comprise an optical access network and an optical core network, wherein each of the edge nodes is configured to access the optical core network via the optical access network or the optical core network directly, and the at least one processing center is configured to access the optical core network via the optical access network or the optical core network directly.

The optical access network may comprise dedicated fiber and/or shared medium access, such as e.g. any kind of PON technologies. A preferred option is a WDM based PON as introduced under the name of NGOA. Direct access to the core may use well known concepts like e.g. (reconfigurable optical) add-drop multiplexers ((RO)ADM).

Each of the edge nodes may comprise at least one of an access device of a wireless communication system, an access device of a wireline communication system, a network gateway, and a service delivery device. Related access devices may comprise, but not be limited to any one of a DSLAM, an Ethernet access switch, any type of a PON ONU, especially an NGOA ONU, any type of a wireless network base station system such as e.g. an eNodeB, etc.

The at least one processing center may be configured to execute traffic control, processing and data forwarding functionality of at least one of the components of a mobile packet core and/or a radio access network. This may especially comprise, but not be limited to the functionality of an S-GW, a P-GW, an eNodeB, an MME or a HSS.

The at least one processing center may be further configured to communicate via the homogeneous transport network with further network node entities located at edges of the homogeneous transport network and providing functionality, or access to functionality, of at least one of the components of a mobile packet core and/or a radio access network.

Furthermore, a data processing apparatus is provided, which is located at an edge of a homogeneous transport network conveying traffic from edge nodes located at edges of the homogeneous transport network to the data processing apparatus, the data processing apparatus comprising:
 a switching device comprising a flow table, for receiving traffic from the homogeneous transport network, analyzing the traffic, separating the traffic into control data and payload data, forwarding the control data to a control data processing device, switching and forwarding the traffic based on entries of the flow table.

The data processing apparatus may further comprise an interface for accessing the flow table and manipulating its entries.

The data processing apparatus may further comprise the control data processing device which is configured to process the control data and manipulate the entries of the flow table based on the processed control data so as to convey traffic including the payload data from the switching device to at least one of the edge nodes based on the flow table entries.

The control data processing device may be further configured to execute control functionality of at least one of the components of a mobile packet core and/or a radio access network.

The switching device and the control data processing device may be connected via at least one of the homogeneous transport network and a separate local interconnection network. The homogeneous transport network may be an optical transport network which comprises an optical access network and an optical core network, wherein the switching device and/or the control data processing device are/is configured to access the optical core network via the optical access network or the optical core network directly.

According to another aspect of the invention, a method of conveying traffic in a communications network is provided, comprising a homogeneous transport network, edge nodes located at edges of the homogeneous transport network and at least one processing center located at an edge of the homogeneous transport network, the method comprising:
 conveying traffic from the edge nodes to the at least one processing center by the homogeneous transport network; and
 processing the traffic and controlling and forwarding traffic to be further conveyed to the edge nodes by the at least one processing center.

Conveying traffic from the edge nodes to the at least one processing center by the homogeneous transport network may comprise tunneling the traffic between the edge nodes and the at least one processing center.

The homogeneous transport network may be an optical transport network which comprises an optical access network and an optical core network, and the method may comprise accessing the optical core network via the optical access network or directly accessing the optical core network by each of the edge nodes, and accessing the optical core network via the optical access network or directly accessing the optical core network by the at least one processing center.

Controlling the traffic by the at least one processing center may comprise executing traffic control, processing and data forwarding functionality of at least one of the components of a mobile packet core and/or a radio access network.

Communication may be provided between the at least one processing center via the homogeneous transport network with further network node entities located at edges of the homogeneous transport network and providing functionality, or access to functionality, of at least one of the components of a mobile packet core and/or a radio access network.

Furthermore, a method for use in a data processing apparatus is provided, which is located at an edge of a homogeneous transport network conveying traffic from edge nodes located at edges of the homogeneous transport network to the data processing apparatus, the method comprising:
  receiving traffic from the homogeneous transport network;
analyzing the traffic, separating the traffic into control data and payload data, and forwarding the control data to a control data processing device; and
switching and forwarding the traffic based on entries of a flow table.

The method may further comprise processing the control data and manipulating the entries of the flow table based on the processed control data by the control data processing device so as to convey traffic including the payload data to at least one of the edge nodes based on the flow table entries.

The method may further comprise executing control functionality of at least one of the components of a mobile packet core and/or a radio access network.

The method may further comprise accessing the control data processing device via at least one of the homogeneous transport network and a separate local interconnection network. The homogeneous transport network may be an optical transport network which comprises an optical access network and an optical core network, and the method may comprise accessing the optical core network via the optical access network or directly accessing the optical core network.

In the following the invention will be described by way of embodiments thereof with reference to the accompanying drawings.

DESCRIPTION OF EMBODIMENTS

A preferred embodiment of the invention is described using the example of a 4G mobile communication network. The approach taken by the present invention is different from the conventional principles of offloading traffic from mobile communication network edges as soon as possible to keep traffic out of the core network, and designing network nodes by functionality so that they best match given transport capabilities.

According to the approach taken by the present invention, traffic is not offloaded at network edges, but all network internal traffic is conveyed to one (or a few) point(s) in the network. In the network, no (C-plane or U-plane) nodes are placed other than base stations, and all payload traffic and all control traffic is handled at one (or a few) point(s) in the network.

In the context of the approach according to the present invention, it is assumed that there is plenty of (or much more than needed) transport capacity available in an end-to-end path of a network, e.g. from a base station connected in an access area of a communications network up to a service network/server in a core area of the network with a distance of up to several 100 km, so bandwidth over a sufficient distance is not an issue. Moreover, it is assumed that there is no disruption in transport technology, i.e. there are no points in the network where traffic needs to be interworked, converted, checked or routed from one transport technology (L1 or L2) to another. These prerequisites may well be given if, for example, advanced optical transport is assumed.

According to the advanced optical transport, even transport in the access area should be fibre based. Almost any peer should be optically connected with the transport network. NGOA optical access concepts may be used, with which distances of up to 100 km can be bridged. Using DWDM network infrastructure including optical amplifiers (EDFA) even higher distances of several 100 km are achievable for NGOA access. Also stacked NGPON-2 concepts run over WDM infrastructures for longer distances compared to GPON.

When using NGOA as access technology OEO disruptions or other intermediate traffic handling becomes obsolete, and traffic can be conveyed transparently from base stations through the network.

In case mobile networks covering complete metropolitan areas situated in geographical areas with diameters which range from 100 km to 200 km are established according to the approach of the present invention, millions of OEO conversion nodes can be saved, saving energy and allowing completely new architectural approaches.

In the following the approach of the invention will be described with respect to an end-to-end communications network according to an embodiment of the invention illustrated in FIG. 5 in comparison to a conventional end-to-end communications network shown in FIG. 4.

Figure 4:
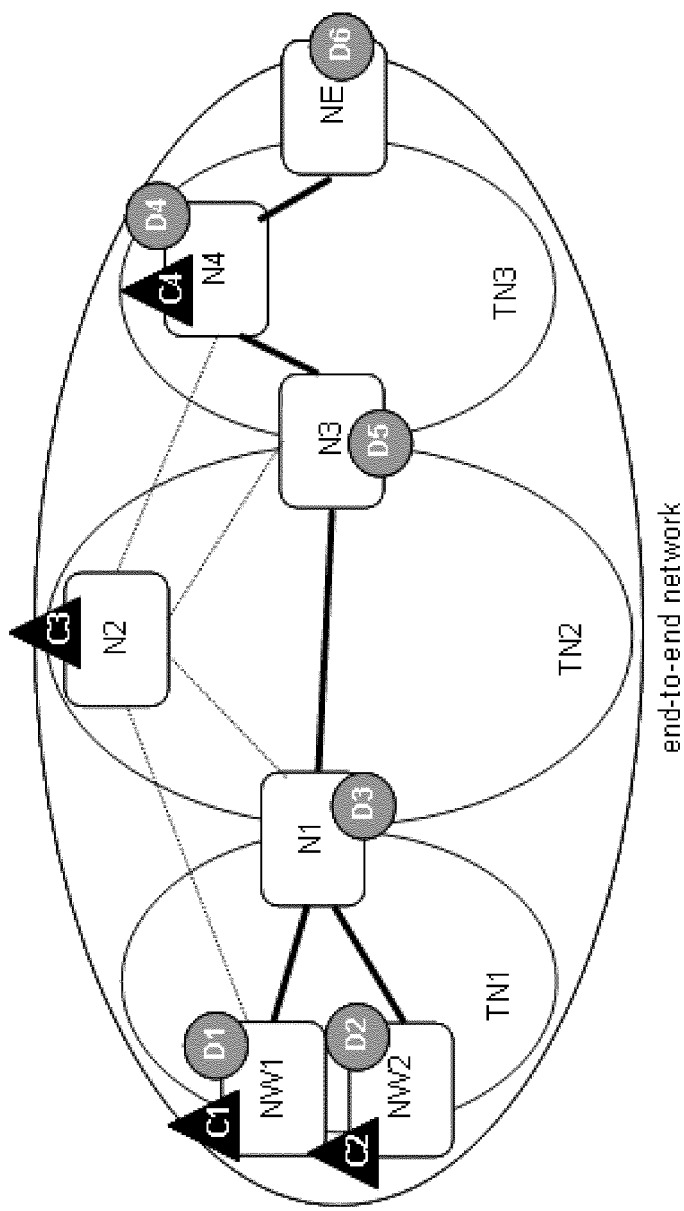
FIG. 4 shows a schematic diagram illustrating a structure of a conventional end-to-end mobile network in a general way.

The end-to-end communications network as shown in FIG. 4 comprises different transport networks TN1 ... TN3, different nodes NW1, NW2, N1 ... N4, NE each of which having control functionality C1 ... C4, data forwarding functionality D1 ... D6 or both, and the nodes NW1, NW2 at a first (Western) border of the network communicate with the node NE at a second (Eastern) border of the network. This conventional network structure is transformed into a network structure according to an embodiment of the invention, illustrated in FIG. 5.

Figure 5:
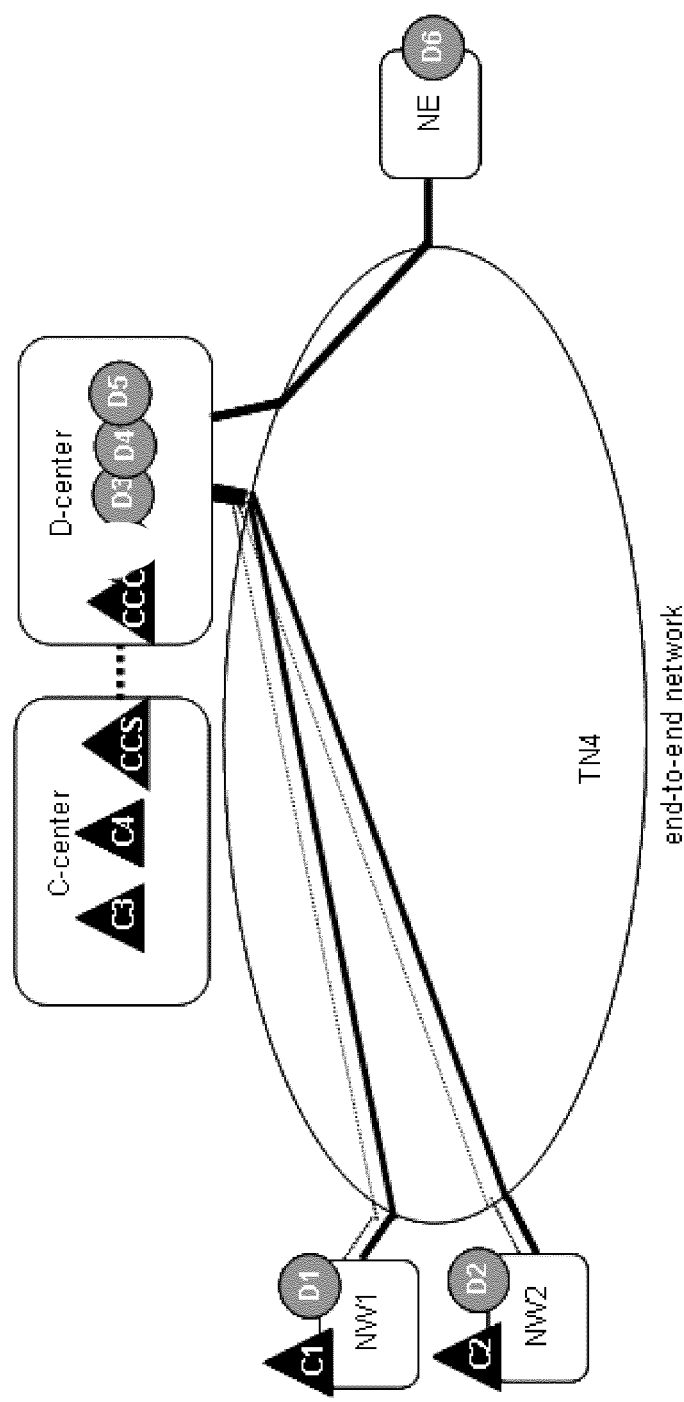
FIG. 5 shows a schematic diagram illustrating a structure of an end-to-end mobile network according to an embodiment of the invention.

As shown in FIG. 5, an end-to-end communications network according to an embodiment of the invention comprises a homogeneous transport network TN4 which may be homogeneous on layer 1 and implemented as optical network, and first and second (e.g. eastern and western) edge nodes NW1, NW2 and NE, representing e.g. servers and base stations. The first (western) edge nodes NW1 and NW2 have control functionality C1, C2 and data forwarding functionality D1, D2, and the second (eastern) edge node NE has data forwarding functionality D6, similar as the edge nodes NW1, NW2 and NE in FIG. 4.

However, according to the embodiment, all traffic on U-plane and C-plane between the edge nodes NW1, NW2, and NE, is conveyed to at least one point in the network, and at this point the traffic is analyzed, separated into control data and payload data, controlled, processed and further distributed. This point may be a processing center comprising a D-center having data forwarding functionality D3 ... D5 and a C-center having control functionality C3, C4. The D-center acts as a common control client and the C-center as a common control server.

The processing center may execute traffic control, processing and data forwarding functionality of at least one of the components of a mobile packet core and/or a radio access network. The processing center may also execute the above functionalities of more than one component of the mobile packet core and/or radio access network, including any combination of the components of the mobile packet core and the radio access network.

According to FIG. 5, in case the edge nodes NW1, NW2 communicate with node NE, the C-center performs control functionalities C3 and C4, and the payload data is conveyed to edge node NE.

In the present application, "homogeneous" refers to a continuous technique without disruptions. The homogeneous transport network does not necessarily comprise a single network as long as a continuous tunnel is provided for conveying traffic between an edge node and the processing center.

The homogeneous transport network may be an optical transport network which provides optical transport paths for the traffic conveyed between the edge nodes and the processing center. For example, a single-wavelength-tunnel or GMPLS tunnel may be provided for traffic between the edge node and the processing center. The optical transport network may comprise an optical access network and an optical core network. The edge nodes and the processing center may access the optical core network via the optical access network or the optical core network directly.

The edge nodes NW1, NW2 may comprise an access device of a wireless communication system, such as WiMAX or WLAN, an access device of a wireline communication system, and a network gateway. The edge node NE may be a device providing services to end users such as a service delivery device or a gateway to another network.

The processing center may communicate via the homogeneous transport network with further network node entities located at edges of the homogeneous transport network and providing functionality, or access to functionality, of at least one of the components of a mobile packet core and/or a radio access network.

The D-center may comprise several cascaded, meshed, or otherwise interconnected switches, capable of analyzing, separating, routing and forwarding traffic streams. The C-center may comprise several interconnected servers for controlling, processing and further distributing traffic streams.

The D-center may be a switching device comprising a flow table, which receives traffic from the homogeneous transport network, analyzes the traffic, separates the traffic into control data and payload data, forwards the control data to the C-center as a control data processing device, and switches and forwards the traffic based on entries of the flow table. The D-center may further comprise an interface for accessing the flow table and manipulating its entries.

The C-center may process the control data and manipulate the entries of the flow table based on the processed control data so as to convey traffic including the payload data from the D-center to at least one of the edge nodes based on the flow table entries. The C-center may execute control functionality of at least one of the components of a mobile packet core and/or a radio access network. The C-center may also execute control functionality of more than one component of the mobile packet core and/or radio access network, including any combination of the components of the mobile packet core and the radio access network.

The D-center and the C-center may e.g. be connected via the homogeneous transport network or a separate local interconnection network. As mentioned, the homogeneous transport network may be an optical transport network which comprises an optical access network and an optical core network. The D-center and/or the C-center may access the optical core network via the optical access network or the optical core network directly. For example, communications between the D-center and C-center may be performed e.g. using the (optical) transport network (e.g. a fiber ring as shown in FIG. 6 to be described in the following), or a separate and dedicated LAN structure.

In order to realize a system as shown in FIG. 5, mainly two issues need to be solved: a homogeneous transport has to be provided which bases on one technology and which can convey traffic between edge nodes on one (lower) layer, preferably on layer 1, and a specific handling on a central point at a network edge has to be provided where all the traffic is conveyed to.

Figure 6:
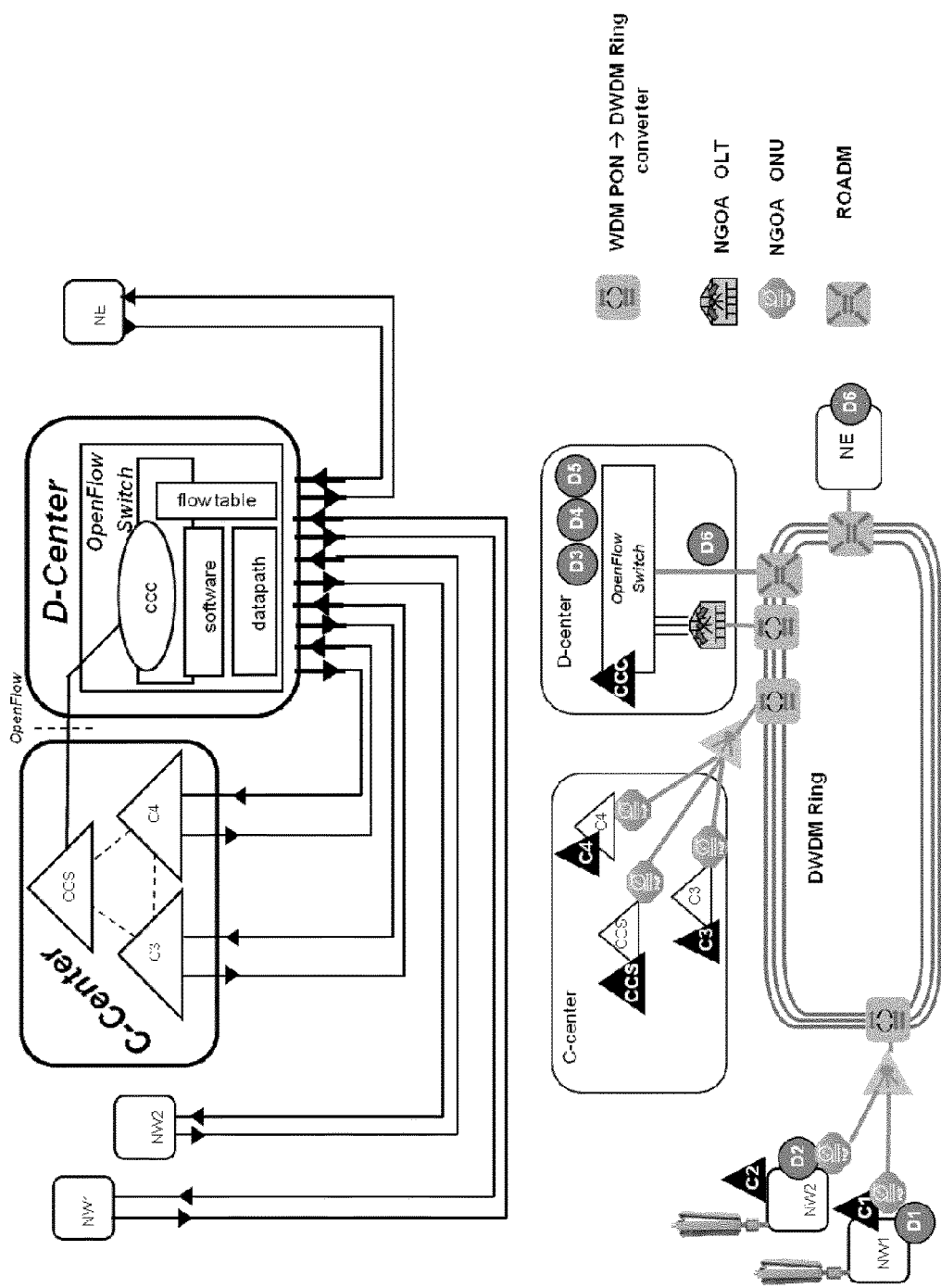
FIG. 6 shows schematic diagrams illustrating an implementation of logical data and control signal flows and a transport architecture in an end-to-end mobile network according to an embodiment of the invention.

FIG. 6 illustrates an implementation example of the end-to-end communications network shown in FIG. 5. The upper drawing in FIG. 6 shows a logical data and control signal flow.

The D-center is shown as including a switch, which may be OpenFlow enabled (OpenFlow Switch). The switch comprises a flow table, a switch control software and a common control client (CCC) for communication with an external control server. The actual switching of packets happens in the unit called data path. The switch (or an assembly of cascaded switches) can be considered as a pure data forwarding engine, e.g. running on layer two, e.g. on Ethernet. Such a switch may have numerous ports (16, 24, 128) for packet data ingress and egress and the forwarding of data packets to different ports is made dependent e.g. on information found in the packet headers. The "rules" to which port received data will be forwarded (i.e. how the header information is to be interpreted) is kept in a flow table which can be modified via the common control interface (interface between CCC in D-center and CCS in C-center), which may be OpenFlow based. This way the switch (or the assembly of cascaded switches) can be kept simple and performant, i.e. it performs nothing but pure packet or flow forwarding. Additional functions, e.g. any processing to be performed on the data flows, if ever required, can easily and efficiently be added with devices connected to the switch.

Incoming traffic (data packets) from base stations NW1 and NW2 contains payload data and control data, which can be distinguished by packet header information (e.g. destination address field). Control data (C-plane data) then are conveyed to a port (or a number of ports) which leads to a domain (C-Center) where control data is processed, indicated by triangles C3, C4, CCS in FIG. 6. In other words, the D-center conveys the control data to the C-center.

As a difference to pure packed forwarding, control data has low or very low bandwidth compared to payload data, but may have high processing demands such as encryption, stateful interworking, etc. Thus, all control functions may be realized in servers and there may be multiple instances of each control function, depending on performance or logical representation, each running on an own virtual machine.

Figure 1:
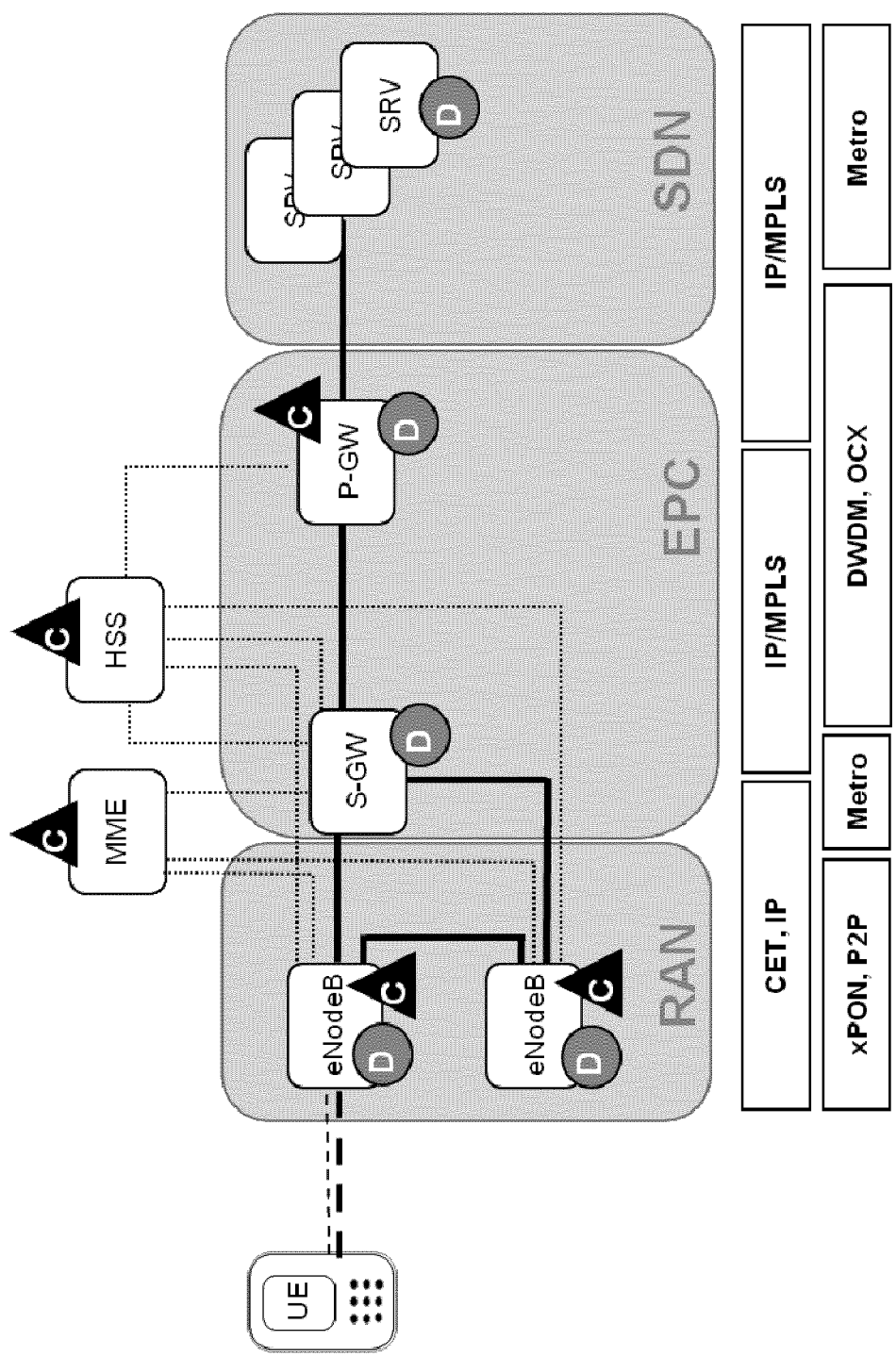
FIG. 1 shows a schematic diagram illustrating a structure of a conventional end-to-end mobile network according to LTE.
Figure 2:
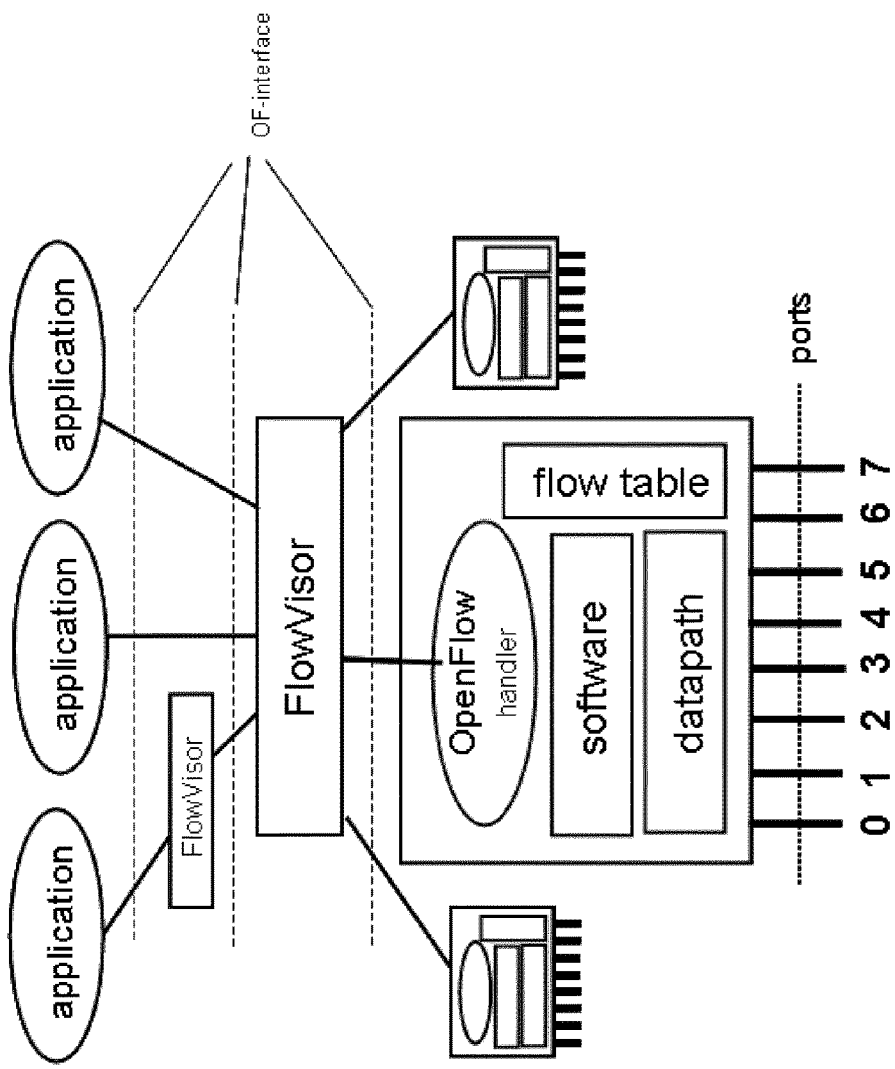
FIG. 2 shows a schematic diagram illustrating a structure of a flow based network virtualization technology.
Figure 3:
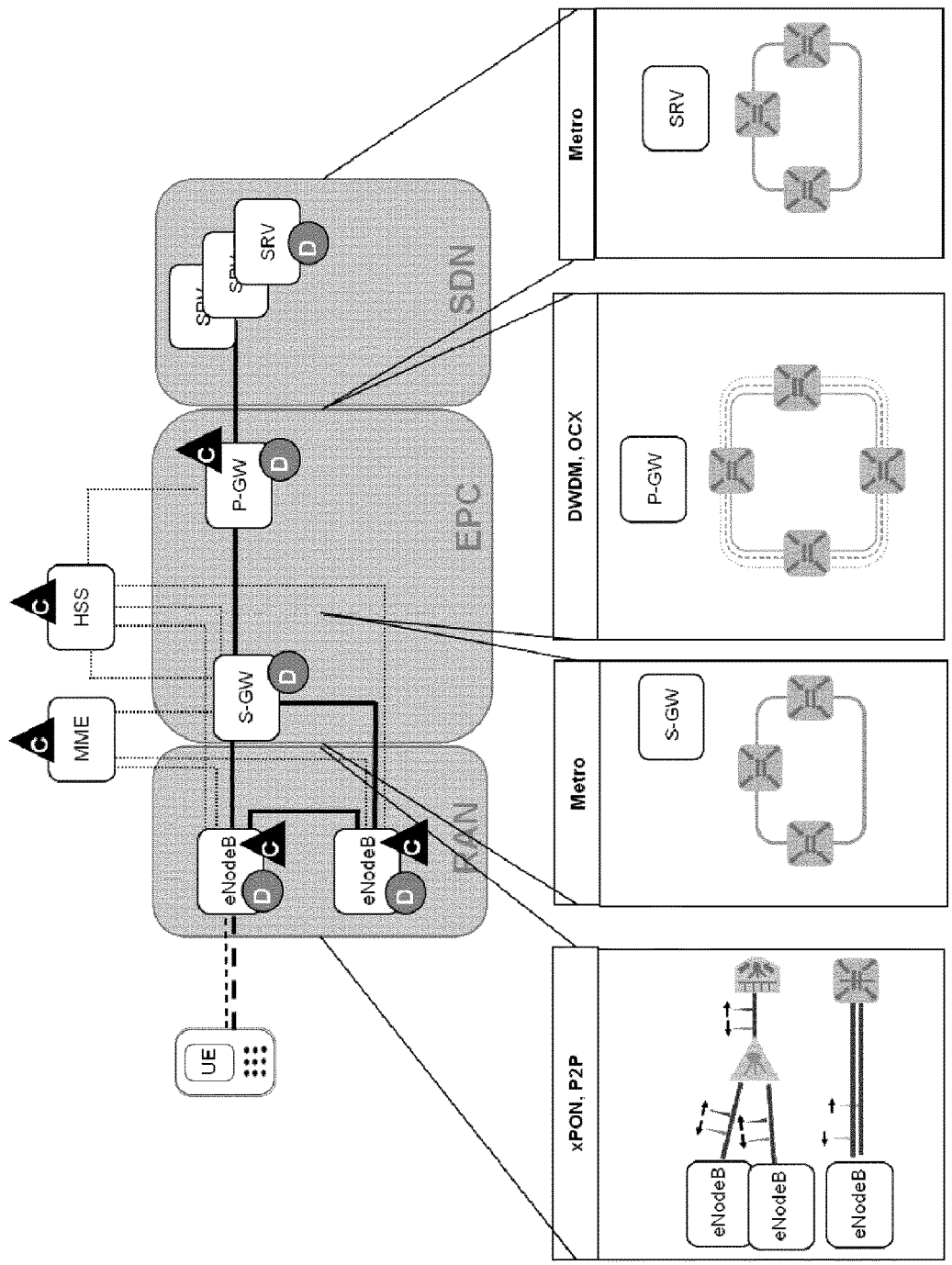
FIG. 3 shows a schematic diagram illustrating an implementation of optical transport in the network of FIG. 1.

The C-Center may perform functionality of components of a mobile packet core. Such components may comprise MME, S-GW, P-GW, HSS, ANDSF and ePDG according to an LTE system. For example, instances of C3 and C4 shown in FIG. 6 may be corresponding functions of an MME or P-GW (see FIG. 1) which communicate with base stations NW1, NW2. The C-Center may comprise one or more control units each comprising processing resources, memory resources and interfaces. The control units may be implemented as separate and self-contained server units.

Furthermore, there is a common control server CCS function in the control domain and a common control client CCC function in the switch as shown in FIG. 6. In the simplest case, the CCC function comprises an API, i.e. allows applications outside the switch to communicate with the switch in order to modify the flow table. The CCS function communicates with all control instances of the control domain and the CCC function of the switch via the (OpenFlow) interface and thus can manipulate the flow table. If there are, for example, control messages from C3 towards NW1, the CCS manipulates the flow table in such a way that those messages are sent in the same stream as the payload data for NW1 (which finally may result in the same optical wavelength), i.e., they are forwarded to the same port of the switch which is connected to NW1.

The lower part of FIG. 6 shows a transport architecture which is based on layer 1 optics with pure wavelength routing according to an implementation example of the invention.

For example, communication between an edge node NW1 or NW2, e.g. an eNodeB, and an edge node NE, e.g. a node of an SDN is assumed. At the eNodeB, a traffic stream including control data and user data is generated, and the data is transported via a NGOA ONU over a fibre infrastructure, for example a DWDM ring, (if required over several 100 km) to an appropriate node in the D-center. The transport may be based on DWDM to PON conversion. In the D-center the user data and control data are separated and the control data is forwarded, e.g. via a NGOA OLT, to the C-center (separate ONU traffic). Based on a processing of the control data in the C-center, the user data is forwarded from the D-center to the edge node NE of the SDN via another port of the switch. As an example, the user data is embedded in a 10G, 40G or 100G stream starting from the switch which may be embedded in the DWDM ring traffic via an ROADM. At the SDN, data will also be provided in the direction towards the switch. The switch aggregates this traffic with other traffic towards the eNodeB, e.g. in a traffic stream from the NGOA OLT to the NGOA ONU of the eNodeB.

Preferably there is only a single processing center. However, for reasons of service availability and reliability, economy, and scalability, there may be a few ones, arranged according to a reasonable function split and/or implementing a suitable redundancy scheme. Still, each processing center should preferably be equipped with full functional support in order to avoid performance and time consuming communication and/or retransmission of traffic between control centers, and to enable fast and efficient delivery of time critical service activities in support of e.g. a call setup or handover in mobile communications.

Conveying all traffic through a single (or one of a few) centralized processing center(s) enables the transit of the complete network with just two (routing) hops and only a single disruption in the transport/transmission formats. This enables a very efficient conveyance of data in the network with a well controlled and minimized delay and reduced processing effort and cost. Prerequisite is an appropriate and sufficient dimensioning of the network transport capacities and the processing centers.

Optical transmission technologies based on WDM and DWDM can provide virtually unlimited transmission capacities at low cost. Separation of control and user plane for nodes with switching and routing functions enables flexible clustering and formation of cost efficient high performance switching centers controlled by scalable and highly adaptive, purpose made control centers using of the shelf commercially available components.

As shown in the above implementation example, the complete traffic load that is forwarded to the processing center at the network edge, can be handled because of the separation of data forwarding functions and control functions, handling data forwarding (U-plane) in a data forwarding domain (D-Center) with cascaded switches, and handling control (C-plane) in a control domain (C-Center), wherein each domain (data forwarding and control) can be scaled independently. That is, more switching capacity can be added to increase throughput, more server capacity can be added to increase control performance with new virtual machines allowing for multiple instances. D-Center and C-Center should preferably be closely colocated. Communication between them may use the transport network, but preferably should be supported by a separate and dedicated local communication infrastructure (local interconnection network) within the processing center. Concentrating the control functions in one location unloads the network from a lot of unnecessary control communications and results in much faster reaction times. Still, existing nodes like e.g. base stations can easily be connected to such networks according to the approach illustrated in FIGS. 5 and 6 without a change in their behavior and functions. And while supporting today's network nodes on one hand (all C-Plane endpoints are still existing) this approach allows for an easy migration by successively moving control functions to the C-Center until a complete re-arrangement is reached.

In a similar way the switching functions of existing nodes can be moved to the D-Center. A single point of switching in the network reduces the end-to-end latency of the data transport to the unavoidable transmission delay of the network spans between the edges and the D-Center and the switching delay in the D-Center. Low latency and reduced delay variations also enable a more accurate transfer of timing and synchronisation information.

Furthermore, an end-to-end transparent L1 optical transport cannot be spoofed (spoofing would corrupt the signal) and so transport from the base stations to the C- and D-centers can be considered as absolutely secure. This will make additional security mechanisms as frequently used in todays networks obsolete.

Figure 7:
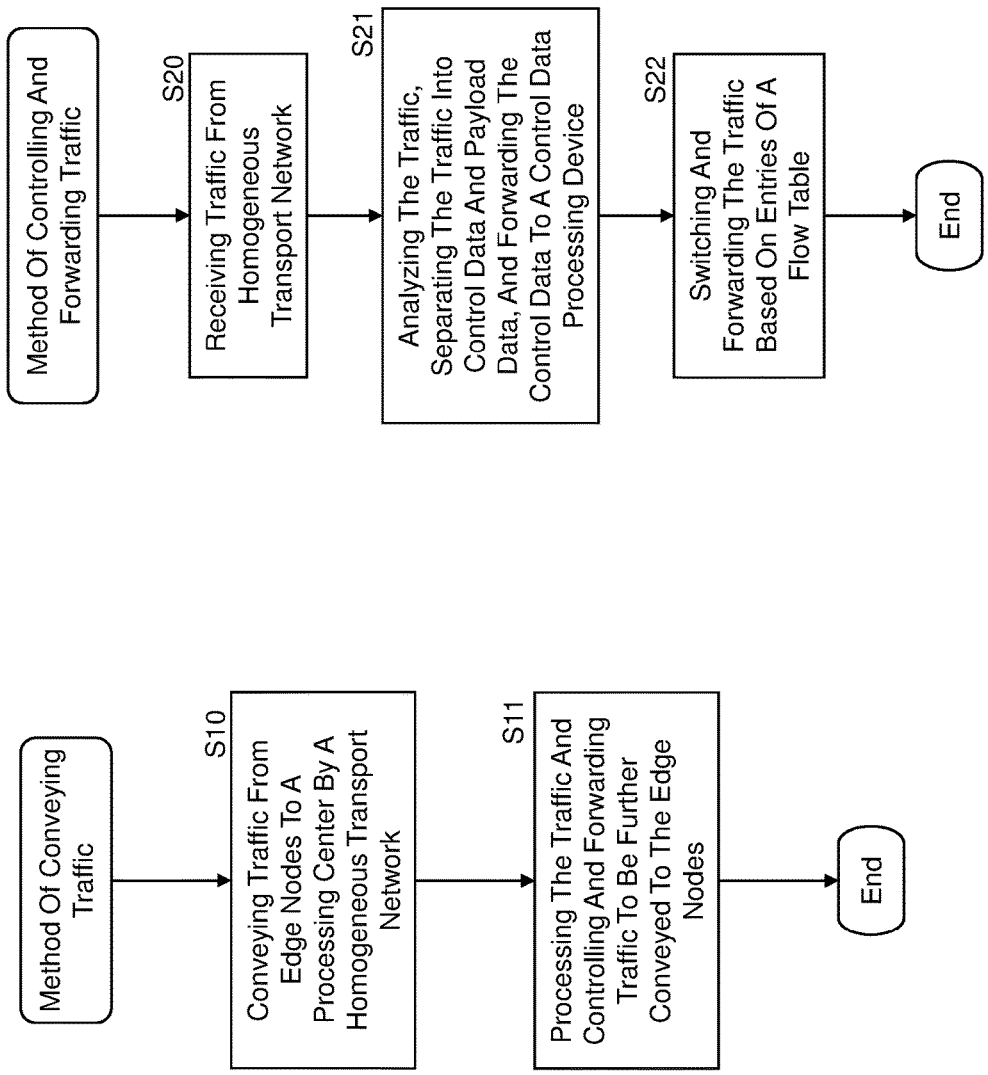
FIG. 7 shows flow charts illustrating procedures of conveying, controlling and forwarding traffic in a communications network system according to an embodiment of the invention.

FIG. 7 shows flow charts illustrating procedures of conveying, controlling and forwarding traffic in a communication network system according to an embodiment of the invention.

On the left side in FIG. 7, a method of conveying traffic according to an embodiment of the invention is illustrated. The method may be performed in a communications network comprising a homogeneous transport network TN4 as shown in FIG. 5, edge nodes NW1, NW2, NE located at edges of the homogeneous transport network and at least one processing center (D-center and C-center) located at an edge of the homogeneous transport network TN4.

In step S10, traffic from edge nodes located at edges of a homogeneous transport network is conveyed by the homogeneous transport network to at least one processing center located at an edge of the homogeneous transport network. In step S11, the traffic is processed and controlled and traffic to be further conveyed to the edge nodes is forwarded by the processing center.

When conveying traffic from the edge nodes to the processing center by the homogeneous transport network, the traffic may be tunneled between the edge nodes and the processing center.

The homogeneous transport network may be an optical transport network which comprises an optical access network, e.g. WDM PON to DWDM ring converter as shown in FIG. 6, and an optical core network, e.g. a DWDM ring as shown in FIG. 6. The optical core network may be accessed by each of the edge nodes via the optical access network or directly. Further, the optical core network may be accessed by the processing center via the optical access network or directly. For example, as shown in FIG. 6, the edge nodes NW1 and NW2 access the homogeneous transport network via the optical access network, and the edge node NE accesses the homogeneous transport network directly.

Controlling the traffic in step S11 comprises executing traffic control, processing and data forwarding functionality of at least one of the components of a mobile packet core and/or a radio access network. Moreover, communication between the processing center is provided via the homogeneous transport network with further network node entities located at edges of the homogeneous transport network and functionality, or access to functionality, of at least one of the components of a mobile packet core and/or a radio access network is provided.

On the right side in FIG. 7, a method of controlling and forwarding traffic according to an embodiment of the invention is illustrated. The method may be adopted in a data processing apparatus, which comprises the D-center and may comprise the C-center shown in FIG. 5 or 6, located at an edge of a homogeneous transport network such as the network TN4, conveying traffic from edge nodes NW1, NW2, NE located at edges of the homogeneous transport network to the data processing apparatus.

In step S20, traffic is received from the homogeneous transport network. In step S21, the traffic is analyzed, separated into control data and payload data, and the control data is forwarded to a control data processing device, e.g. the C-center shown in FIG. 5 or 6. In step S22, the traffic is switched and forwarded based on entries of a flow table.

In step S21, the control data may be processed and the entries of the flow table may be manipulated based on the processed control data by the control data processing device so as to convey traffic including the payload data to at least one of the edge nodes based on the flow table entries. In step S21, control functionality of at least one or more than one or a combination of the components of a mobile packet core and/or a radio access network is performed.

The control data processing device may be accessed via at least one of the homogeneous transport network and a separate local interconnection network. In case the homogeneous transport network is an optical transport network which comprises an optical access network and an optical core network, the optical core network may be accessed via the optical access network or directly.

According to an aspect of the invention, traffic is conveyed in a communications network using a homogeneous transport network from edge nodes located at edges of the homogeneous transport network to at least one processing center located at an edge of the homogeneous transport network. The at least one processing center processes the traffic and controls and forwards traffic to be further conveyed to the edge nodes.

It is to be understood that the above description is illustrative of the invention and is not to be construed as limiting the invention. Especially, possible applications should not be considered as being limited to mobile communication networks. Various modifications and applications may occur to those skilled in the art without departing from the true spirit and scope of the invention as defined by the appended claims.

The invention claimed is:

1. A data processing apparatus located at an edge of an optical transport network, that conveys traffic on at least one optical transport path of the optical transport network, from an edge node located at an edge of the optical transport network to the data processing apparatus, the data processing apparatus comprising:
   a switching device comprising a flow table, the switching device configured to receive traffic from the optical transport network, separate the traffic into control data and payload data, process the control data, and forward without processing the payload data on at least one other of the optical transport paths to at least one other edge node, based on entries of the flow table.

2. The data processing apparatus of claim 1, further comprising an interface for accessing the flow table and manipulating its entries.

3. The data processing apparatus of claim 1, further comprising the control data processing device which is configured to process the control data and manipulate the entries of the flow table based on the processed control data so as to forwarding without processing the payload data from the switching device to the at least one other edge node based on the flow table entries.

4. The data processing apparatus of claim 1, wherein the control data processing device is further configured to execute control functionality of at least one of the components of a mobile packet core and/or a radio access network.

5. The data processing apparatus of claim 1, wherein the switching device and the control data processing device are connected via at least one of the optical transport network and a separate local interconnection network,
and/or the optical transport network comprises an optical access network and an optical core network, wherein the switching device and/or the control data processing device are/is configured to access the optical core network via the optical access network or the optical core network directly.

6. A method for use in a data processing apparatus located at an edge of an optical transport network, the method comprising:
receiving traffic from the optical transport network, wherein the optical transport network conveys traffic on at least one optical transport path of the optical transport network, from at least one edge node located at an edge of the optical transport network to the data processing apparatus;
separating the traffic into control data and payload data;
processing the control data; and
forwarding without processing the payload data on at least one other optical transport path of the optical transport network to at least one other edge node located at another edge of the optical transport network, based on entries of a flow table.

7. The method of claim 6, further comprising:
processing the control data and manipulating the entries of the flow table based on the processed control data by the control data processing device so as to forward without processing the payload data to the at least one other edge node based on the flow table entries.

8. The method of claim 6, comprising: executing control functionality of at least one of the components of a mobile packet core and/or a radio access network.

9. The method of claim 6, comprising:
accessing the control data processing device via at least one of the optical transport network and a separate local interconnection network,
and/or wherein the optical transport network is an optical transport network which comprises an optical access network and an optical core network, the method comprising:
accessing the optical core network via the optical access network or directly accessing the optical core network.

10. A computer program product comprising a non-transitory computer readable medium including a program for a data processing apparatus located at an edge of an optical transport network, comprising software code portions for causing the data processing apparatus to perform at least the following:
receiving traffic from the optical transport network, wherein the optical transport network conveys traffic on at least one optical transport path of the optical transport network, from at least one edge node located at an edge of the optical transport network to the data processing apparatus;
separating the traffic into control data and payload data,
processing by the data processing apparatus the control data; and
forwarding without processing the payload data on at least one other optical transport path of the optical transport network to at least one other edge node located at another edge of the optical transport network, based on entries of a flow table.

11. The computer program product of claim 10, further comprising software code portions for causing the data processing apparatus to perform at least the following:
processing the control data and manipulating the entries of the flow table based on the processed control data by the control data processing device so as to forward without processing the payload data to the at least one of other edge node based on the flow table entries.

12. The computer program product of claim 10, further comprising software code portions for causing the data processing apparatus to perform at least the following:
executing control functionality of at least one of the components of a mobile packet core and/or a radio access network.

13. The computer program product of claim 10, further comprising software code portions for causing the data processing apparatus to perform at least the following:
accessing the control data processing device via at least one of the optical transport network and a separate local interconnection network,
and/or wherein the optical transport network is an optical transport network which comprises an optical access network and an optical core network, the method comprising:
accessing the optical core network via the optical access network or directly accessing the optical core network.

* * * * *